US005871156A

United States Patent [19]

Lawson

[11] Patent Number: 5,871,156

[45] Date of Patent: Feb. 16, 1999

[54] SPRINKLER WITH REMOVABLE VALVE SEAT

[75] Inventor: Kenneth L. Lawson, Rancho Cucamonga, Calif.

[73] Assignee: Anthony Manufacturing, Co., Azusa, Calif.

[21] Appl. No.: 850,213

[22] Filed: May 2, 1997

[51] Int. Cl.[6] ...... A01G 25/06

[52] U.S. Cl. ...... 239/201; 239/205; 239/206; 251/46; 251/363; 137/327

[58] Field of Search ...... 239/200–7, 569, 239/570, 571, 583, 590, 590.3, 590.5, 600, 580; 251/46, 61.5, 363; 137/327, 328

[56] References Cited

U.S. PATENT DOCUMENTS

| | | |
|---|---|---|
| 4,625,914 | 12/1986 | Sexton et al. . |
| 4,637,548 | 1/1987 | Ray et al. . |
| 4,681,259 | 7/1987 | Troup . |
| 5,240,182 | 8/1993 | Lemme . |
| 5,240,184 | 8/1993 | Lawson . |

OTHER PUBLICATIONS

Conserving Nature's Resources Since 1933 900E; 51DR; Rain Bird Golf Irrigation—pp. 4, 12, (no date).

*Primary Examiner*—Andres Kashnikow
*Assistant Examiner*—Lisa Ann Douglas
*Attorney, Agent, or Firm*—Kelly Bauersfeld; Lowry & Kelley, LLP.

[57] ABSTRACT

An irrigation sprinkler of the type having an inlet control valve is provided with a removable valve seat formed integrally with an inlet filter screen. The valve seat is positioned to engage a valve head to normally prevent water inflow to a sprinkler case, whereas the filter screen prevents entry of small rocks and other particulate debris into the sprinkler case when the inlet control valve is open. The valve seat is removable from the top of the sprinkler case, without requiring disconnection of the case from a water supply line, to permit flushing of collected debris or to permit replacement of a damaged valve seat.

19 Claims, 3 Drawing Sheets

SPRINKLER WITH REMOVABLE VALVE SEAT

BACKGROUND OF THE INVENTION

This invention relates generally to irrigation sprinklers, and more particularly to an improved irrigation sprinkler of the type having an inlet control valve for controlling connection of the sprinkler to a water supply line. The improved sprinkler of the present invention includes a removable valve seat for the inlet control valve, wherein the valve seat is combined with an inlet filter screen and is adapted for quick and easy removal from the top of a sprinkler case or housing.

Irrigation sprinklers are well known in the art for use in supplying irrigating water over a circular or part-circular ground area around the sprinkler. Typically, such sprinklers employ single or multiple outlet spray nozzles through which the water is ejected upwardly and radially outwardly from the sprinkler case, and include rotary drive means for rotating the spray nozzle, such as an impact drive arm assembly which interrupts the stream from the nozzle, or a water operated drive motor such as a ball drive, gear drive or turbine drive apparatus mounted within the sprinkler case. In many sprinklers, the sprinkler also includes a pop-up mechanism wherein the spray nozzle is attached to the upper end of a tubular riser mounted within the sprinkler case for pressure responsive movement between an elevated position above the sprinkler case during normal operation and a retracted position disposed substantially within the case when the sprinkler is not in operation. In a common installation, the sprinkler case has a lower end thereof connected to an underground water supply line, with the sprinkler case partially buried to position the upper end thereof substantially at ground level.

In many irrigation sprinklers of the type described above, an inlet control valve is provided at the lower end of the sprinkler case to control water inflow from the water supply line. In one typical form, as shown and described in U.S. Pat. No. 4,681,259, the inlet control valve comprises a pressure responsive valve assembly designed to prevent water inflow to the sprinkler case unless and until the water pressure rises to a predetermined minimum threshold pressure level. As a result, when the water supply is initially turned on, the inlet control valve prevents water flow to the sprinkler until the water pressure rises sufficiently to provide proper sprinkler pop-up and rotary drive operation. Similarly, when the water supply is turned off, the inlet control valve prevents water inflow to the sprinkler case when the line pressure falls below the minimum threshold level for proper sprinkler operation. Accordingly, undesirable flow of water through the sprinkler at low pressure and resultant puddling in the vicinity of the sprinkler is avoided. This problem can be significant in a system of sprinklers connected to a common supply line, wherein residual water remaining within the supply line would otherwise drain to and through sprinklers located at relatively low elevational positions.

A filter screen is normally mounted at the upstream side of the inlet control valve to trap and retain small rocks and other particulate debris and thereby prevent entry thereof into the sprinkler case. Such particulate matter, if allowed to flow into the sprinkler case, could interfere with proper sprinkler operation by jamming or damaging mechanical components of the sprinkler. However debris collected by the filter screen tends to accumulate over a period of time, and ultimately may accumulate to a point where the collected debris represents a sufficient pressure drop obstruction to prevent proper sprinkler operation. When this occurs, the filter screen must be accessed in order to clean and flush the collected debris therefrom. In the past, significant labor and time has been required to excavate and disassemble the sprinkler case from the buried water supply line to permit access to the filter screen at the lower end of the sprinkler case, followed by re-assembly of the sprinkler to the underground supply line.

Another problem encountered with irrigation sprinklers involves pitting and wear of the valve seat included as part of the inlet control valve, resulting in undesired low pressure water leakage through the sprinkler case when the inlet control valve is closed. In this regard, the valve seat for the inlet control valve normally comprises a plastic surface formed or otherwise mounted on the plastic molded sprinkler case. Over time, small pebbles and grit such as rust particles and the like of a sufficiently small size to pass through the filter screen can impact and damage the valve seat. Attempts to prevent such damage by using a smaller mesh filter screen unfortunately result in a more frequent clogging of the filter screen. When valve seat damage occurs, it has been necessary to excavate and disassemble the sprinkler case from the buried water supply line for appropriate replacement, typically by installation of a new sprinkler case. Once again, such remedial action is a time consuming and labor intensive process.

There exists, therefore, a need for an improved mounting arrangement for a valve seat of a sprinkler inlet control valve, and for an inlet filter screen associated therewith, to provide improved and facilitated access to the valve seat and filter screen in the event that service or replacement is required, without requiring the sprinkler case to be disassembled from the associated water supply line or otherwise removed from the ground. The present invention fulfills these needs and provides further related advantages.

SUMMARY OF THE INVENTION

In accordance with the invention, an improved irrigation sprinkler includes an inlet control valve having a valve seat adapted for quick and easy removal and replacement from the top of a sprinkler case, without requiring disassembly of the sprinkler case from an associated water supply line. The valve seat is connected directly to an inlet filter screen which is thus also removable quickly and easily from the top of the sprinkler case for convenient cleaning and flushing.

The improved irrigation sprinkler comprises the sprinkler case of hollow construction to include an inlet fitting at a lower end thereof for connection to a typically buried water supply line, with an upper end of the sprinkler case positioned substantially at ground level. A pop-up sprinkler member is mounted within the sprinkler case for pressure responsive pop-up movement between a normal position retracted substantially within the sprinkler case, and an elevated position with a spray nozzle disposed above the sprinkler case to deliver an upwardly and radially outwardly directed water stream to the surrounding terrain. A rotary drive means is normally provided for rotating the spray nozzle through a circular or part-circular path. The inlet control valve is mounted within the sprinkler case and includes a valve head for normally engaging the valve seat formed on a seat ring mounted removably at the inlet fitting, as by a threaded connection between the seat ring and the sprinkler case. In one form, the valve head is spring-loaded to engage the valve seat to prevent water inflow to the sprinkler case unless the supply line pressure exceeds a predetermined minimum threshold level.

The seat ring having the valve seat formed thereon is exposed for access from above, via the top of the sprinkler case, following appropriate removal of the sprinkler member and associated rotary drive means through the top of the sprinkler case. In the preferred form, the seat ring includes one or more tool flats for engagement from above by an installation tool for thread-out removal and for thread-in re-installation or replacement with a new seat ring.

The filter screen is connected to the seat ring, such as by forming the seat ring and filter screen as an integrated one-piece construction. The filter screen is carried by the seat ring at a position upstream from the valve seat when said seat ring is mounted as described at the inlet fitting on the sprinkler case. The filter screen is removable with the seat ring, through the top of the sprinkler case, for facilitated cleaning and flushing.

Other features and advantages of the present invention will become more apparent from the following detailed description taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
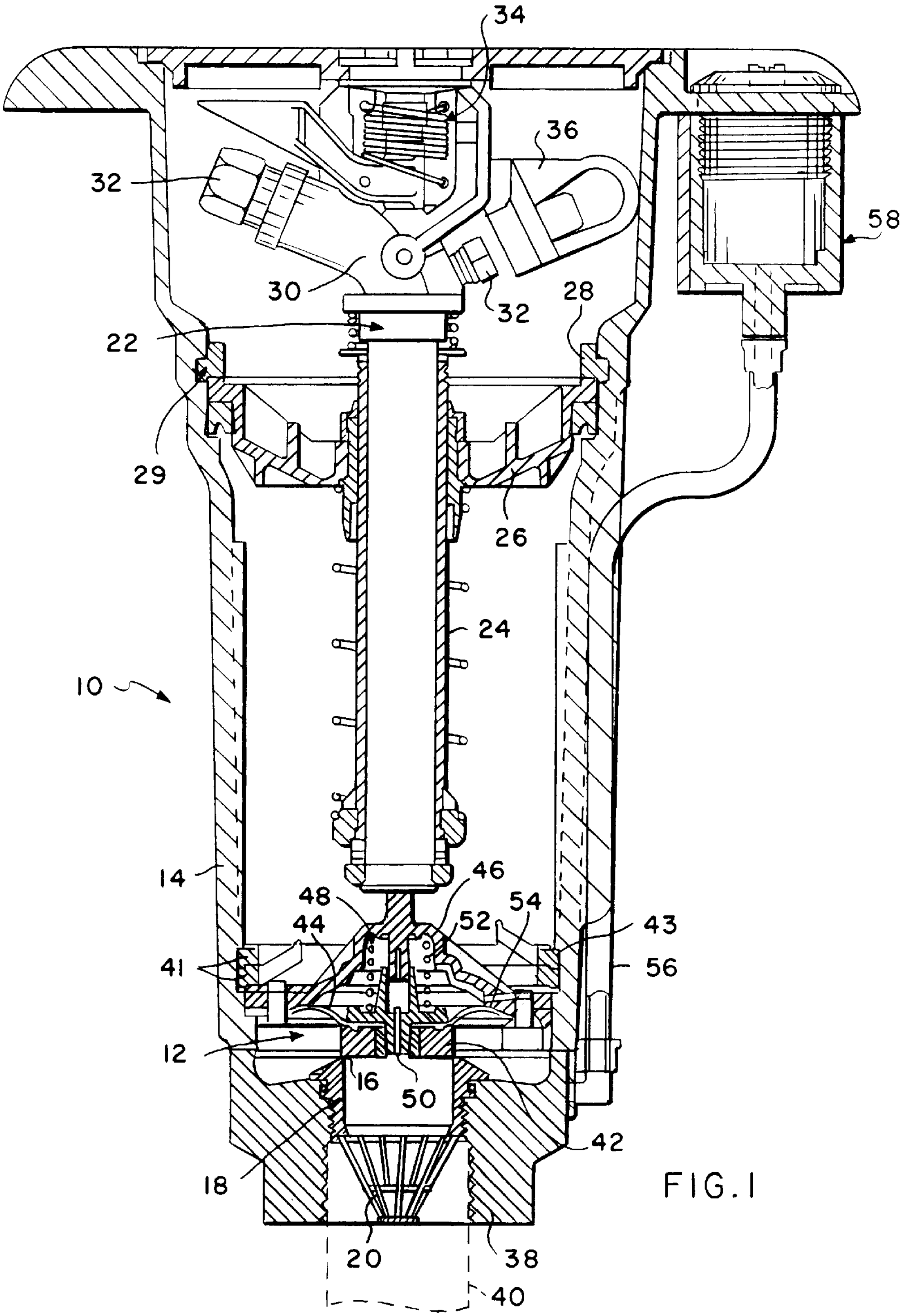
FIG. 1 is a vertical sectional view of an irrigation sprinkler including an inlet control valve having a removable valve seat and related inlet filter screen in accordance with the novel features of the invention.

As shown in the exemplary drawings, an irrigation sprinkler referred to generally in FIG. 1 by the reference numeral 10 includes an inlet control valve 12 for controlling inflow of water to a hollow sprinkler case 14. The inlet control valve 12, in accordance with the invention, includes a valve seat 16 formed as part of a removable seat ring 18 adapted for quick and easy removal and replacement by access through the top of the sprinkler case 14. The valve seat ring 18 is connected to an inlet filter screen 20 which is also removable therewith for convenient cleaning and flushing.

The irrigation sprinkler 10 shown in the illustrative drawings has a generally conventional overall construction and operation, adapted to incorporate the removable seat ring 18 and related inlet filter screen 20 in accordance with the present invention. More specifically, the sprinkler case 14 has a generally cylindrical construction of molded plastic or the like to define a hollow interior for receiving and supporting a sprinkler member 22, such as a pop-up sprinkler member of the impact drive type as shown in FIG. 1. This illustrative sprinkler member 22 includes a tubular riser 24 mounted for longitudinal sliding movement within an annular bearing guide 26 which is secured within the case interior by means of a removable snap ring 28 or the like seated within a peripheral groove 29 formed in the interior wall surface of the case 14. An upper end of the riser 24 is connected above the bearing guide 26 to a spray head 30 including at least one spray nozzle 32 for directing a stream of water in an upward and outward direction to irrigate the surrounding ground area. FIG. 1 shows the spray head to include a pair of spray nozzles 32, and further to include a conventional rotary drive means 34 in the form of a spring-loaded impact drive arm 36 for repetitively interrupting one of the water streams to rotate the spray head through a circular or selected part-circle path of motion, all in a manner well known to persons skilled in the art.

The lower end of the sprinkler case 14 includes an inlet fitting 38 for suitable connection as by threaded attachment to a water supply line 40. Water under pressure is delivered by the supply line 40 through the inlet fitting 38 to the interior of the sprinkler case 14 below the bearing guide 26, resulting in pop-up movement of the riser 24 and spray head 30 from the normal position (FIG. 1) retracted into and substantially concealed within the case 14, to an operational position (not shown) with the spray head 30 and nozzles 32 disposed above the case 14 to deliver the irrigation water to the surrounding ground area. In this regard, the water supply line 40 is normally buried in the ground, and the sprinkler case 14 is normally installed in a partially buried condition with an upper end of the case 14 disposed substantially at or slightly above grade level. In this manner, the irrigation sprinkler 10 is substantially contained below the ground surface in an out-of-the-way position when not in operation, but the spray head 30 is elevated above the ground during sprinkler operation.

While FIG. 1 shows an exemplary irrigation sprinkler of the impact drive type, persons skilled in the art will recognize and readily appreciate that alternative spray head and rotary drive mechanisms can be used. Such alternative mechanisms include, for example, water powered drive motors such as ball drive, gear drive and turbine drive devices for rotating the spray head through a circular or part-circle path of motion. See, for example, U.S. Pat. Nos. 4,681,259; 4,525,914; 5,240,182 and 5,240,184 for alternative spray nozzle and rotary drive mechanisms. Commercially available sprinklers of these types include the Rain Bird 47/51 impact drive series and the Rain Bird 900/950 rotor drive series sprinklers, marketed by Rain Bird Sprinkler Mfg., Corp., of Glendora, Calif.

The inlet control valve 12 is mounted and retained within the sprinkler case 14 generally at the inlet fitting 38 by means of one or more removable snap rings 41 seated within a peripheral groove 43 in the sprinkler case 14. In the form shown, the inlet control valve 12 comprises a conventional diaphragm-type pressure responsive valve assembly for preventing water flow from the supply line 40 into the sprinkler case 14, unless the water pressure is greater than a predetermined minimum threshold level. Thus, when the water supply is initially turned on, the inlet control valve 12 remains closed to prevent water inflow to the sprinkler until the water pressure rises sufficiently to provide relatively rapid pop-up movement of the riser 24 and associated spray head 30, and also to insure proper water stream discharge and operation of the rotary drive means 34. Similarly, when the water supply is turned off at the conclusion of an irrigation cycle, the inlet control valve 12 re-closes as the line pressure falls below the predetermined threshold to prevent water flow through the sprinkler. Accordingly, the inlet control valve prevents low pressure water flow or low pressure drainage through the sprinkler, wherein such low pressure flows could otherwise result in undesirable puddling of water on the ground around the sprinkler.

In general terms, the diaphragm-type inlet control valve 12 depicted in the exemplary drawings includes a valve head 42 of resilient material for sealingly engaging the annular valve seat 16. The valve head 42 is carried by a movable diaphragm 44 for movement between a normal closed position engaging the valve seat 16, and an open position retracted from the valve seat to permit water inflow to the sprinkler case 14. The diaphragm 44 is carried by a compact valve housing 46 and cooperates therewith to define a pressure chamber 48 into which a portion of the water from the supply line 40 is allowed to bleed through an inlet bleed port 50 formed through the center of the valve head 42. A biasing spring 52 may also be provided to bias the valve head toward the normal closed position. One side of the pressure chamber 48 communicates through an outlet bleed port 54 and an associated control line 56 with a regulator module 58, typically including a solenoid actuator (not shown) operable to permit or prevent water outflow from the pressure chamber 48, and thereby regulate the open or closed position of the valve head 42.

More particularly, the regulator module 58 can be set to prevent water outflow from the pressure chamber 48, whereupon bleed water inflow to the pressure chamber causes the pressure therein to rise to the pressure level within the water supply line 40. The presence of line pressure acting upon the rear side of the diaphragm 44 provides a valve closure force which exceeds the countering force applied by line pressure to the smaller surface area of the valve head 42, resulting in closure of the valve head. However, when the regulator module 58 is actuated to permit water outflow from the pressure chamber 48, and the water supply is turned on to provide a rapid pressure rise at the upstream side of the valve head 42, the differential pressure across the valve head 42 will rise to a sufficient level to hydraulically open the inlet control valve. The specific pressure level at which the inlet control valve is opened can be regulated by the particular design of the inlet control valve, all in a manner known to persons skilled in the art. Moreover, it will be understood that alternative inlet control valve geometries may be used, including, for example, electric and hydraulic valve actuators.

Figure 2:
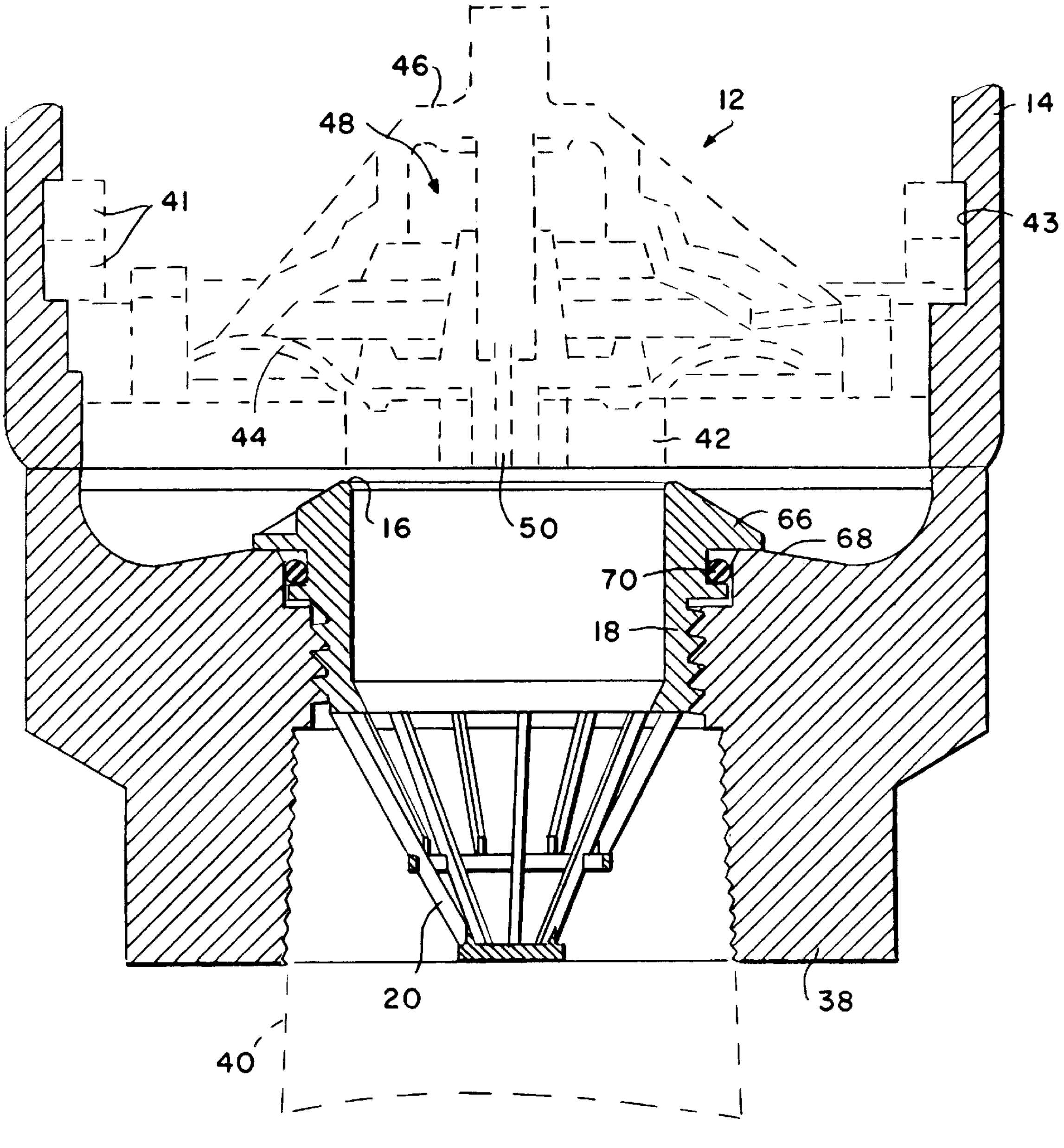
FIG. 2 is an enlarged fragmented vertical sectional view, similar to a portion of FIG. 1, and depicting the removable valve seat and related filter screen mounted at an inlet fitting of a sprinkler case.
Figure 3:
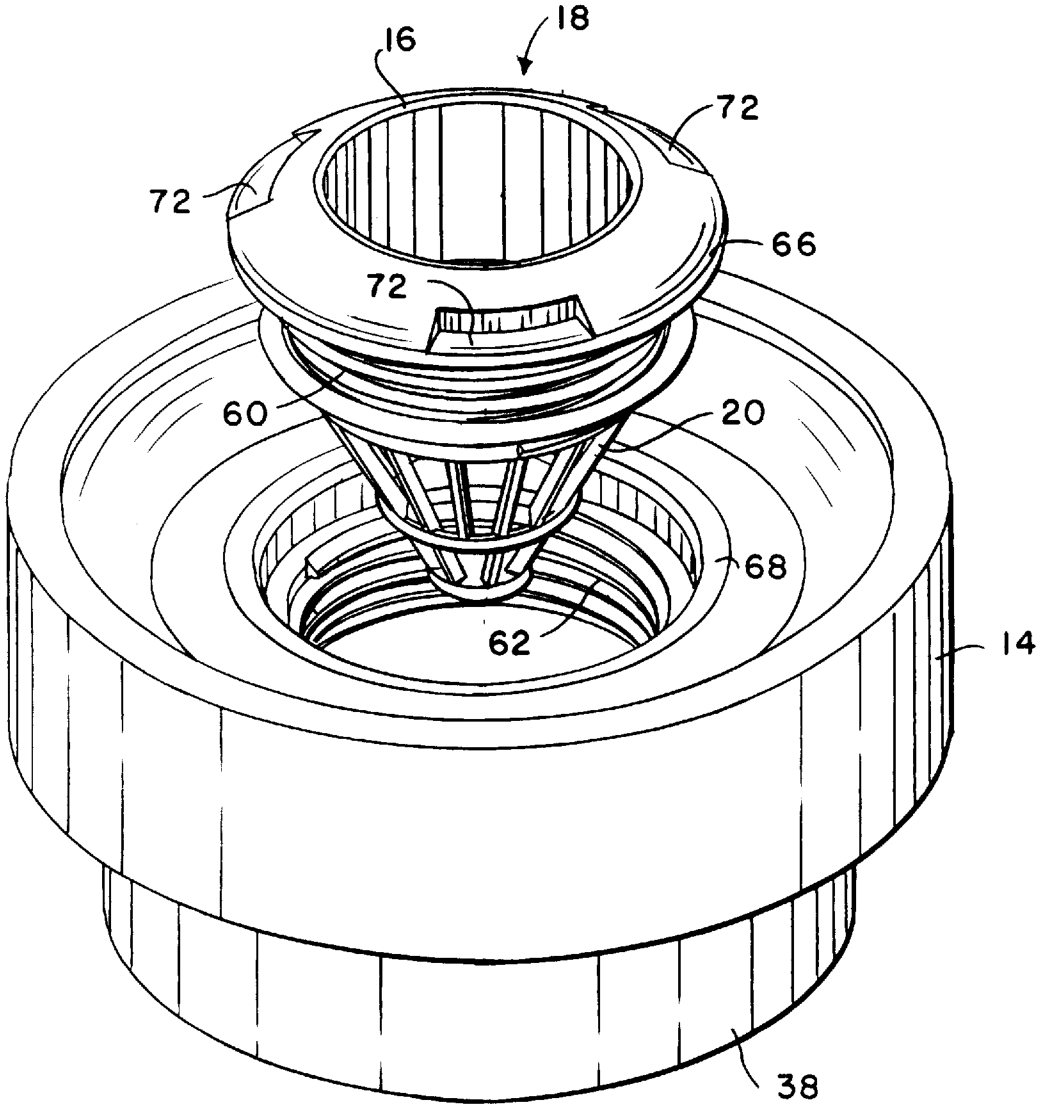
FIG. 3 is a fragmented and exploded perspective view illustrating removable installation of the valve seat and filter screen at the sprinkler case inlet fitting.

As shown best in FIGS. 2 and 3, the valve seat 16 for the inlet control valve 12 comprises an annular surface formed on the seat ring 18 which is adapted to be removably mounted on the sprinkler case 14 at the upstream side of the inlet fitting 38. In the preferred form, the seat ring 18 is constructed from molded plastic or the like to have a generally cylindrical shape with an external thread 60 (FIG. 3) for threaded engagement with an internal thread 62 formed within a mounting bore at the lower end of the sprinkler case 14. A radially enlarged upper flange 66 is conveniently formed at the upper end of the seal ring 18 and provides a stop for engaging a shoulder 68 defined at the lower end of the case interior. An O-ring seal 70 or the like may be interposed between the flange 66 and the case shoulder 68 to prevent water leakage therebetween.

The seat ring 18 is designed to be initially installed into the mounting bore from above, namely, by access via the upper end of the sprinkler case 14 prior to installation of the inlet control valve 12 and the sprinkler member 22. A plurality of upwardly presented tool flats 72 (FIG. 3) are formed in the flange 66, to provide upwardly presented recesses for receiving the tips or prongs (not shown) of an appropriate installation tool (also not shown) for rotational thread-in mounting of the seat ring. The inlet control valve 12 can then be installed and retained in place by the snap rings 41, and the sprinkler member 22 is installed with the bearing guide 26 retained by the snap ring 28. Alternative mounting means for the seat ring 18, such as a quarter-turn mount or the like, may be used.

In the event that it becomes necessary or desirable to remove the seat ring 18 from the sprinkler 10 for replacement or other service activities, the seat ring 18 is removable by access through the top of the sprinkler without requiring the sprinkler to be excavated or otherwise disassembled from the buried water supply line 40. That is, seat ring removal is accomplished by removing the snap ring 28 associated with the bearing guide 26 to permit lift-out removal of the sprinkler member 22 inclusive of the related rotary drive means 34. The snap rings 41 associated with the diaphragm valve assembly 12 are then exposed for removal to permit similar lift-out removal of the valve assembly to expose the seat ring 18. The installation tool can then be utilized to rotatably remove the seat ring 18, and to facilitate installation of a new seat ring 18. The inlet valve assembly and the sprinkler member 22 can then be reinstalled quickly and easily to return the sprinkler to normal operation. In this way, a damaged valve seat 16 can be replaced quickly and easily from the top of the sprinkler, without requiring the original sprinkler case to be removed from the ground.

In accordance with a further aspect of the invention, the filter screen 20 is connected directly to the removable seat ring 18, and thus is also removable quickly and easily from the sprinkler case 14 without requiring the case to be removed from the ground. In the preferred form, the filter screen 20 is constructed from molded plastic as an integral portion of the seat ring 18 to be disposed generally within the inlet fitting 38 when the seat ring is mounted on the sprinkler. The filter screen 20 functions to collect rocks and other debris present in the water supply, to prevent inflow of such debris past the valve seat 16 or into the interior of the sprinkler case 14. When cleaning or flushing of debris collected on the filter screen is desired or required, the seat ring 18 is accessed and removed as described above to also result in removal of the filter screen 20 through the top of the sprinkler case. With the seat ring and filter screen removed, the water supply can be turned on briefly to flush particulate debris from the supply line 40, after which a cleaned or replacement filter screen can be re-installed quickly and easily to return the sprinkler to normal service.

From the foregoing, is should be appreciated that the present invention provides a new and improved irrigation sprinkler wherein a damaged inlet control valve seat can be accessed and replaced quickly and easily, and further wherein a clogged filter screen at an inlet fitting for the sprinkler can also be accessed quickly and easily for cleaning or replacement, without requiring the original sprinkler case to be removed from the ground. While a particular form of the invention has been illustrated and described herein, it will also be apparent that various modifications and changes can be made without departing from the principles of the invention as set forth in the appended claims.

What is claimed is:

1. In an irrigation sprinkler having a hollow sprinkler case with a sprinkler member removably mounted therein, an inlet fitting on the sprinkler case for connection to a water supply line, and an inlet control valve removably mounted within said sprinkler case for controlling water inflow through said inlet fitting into said case, the improvement comprising:

a seat ring removably mounted on said sprinkler case generally at said inlet fitting and defining a valve seat for engagement by said inlet control valve to control water inflow through said inlet fitting into said case;

said seat ring being accessible through said case upon removal of said sprinkler member and said inlet control valve from said case to permit removal and selective replacement of said seat ring without requiring disassembly of said case from the water supply line.

2. The improvement of claim 1 wherein said seat ring has an inlet filter screen connected thereto for removal therewith when said seat ring is removed from said case.

3. The improvement of claim 2 wherein said filter screen is positioned generally within said inlet fitting upstream from said valve seat when said seat ring is mounted on said case.

4. The improvement of claim 2 wherein said filter screen is formed integrally with said seat ring.

5. The improvement of claim 1 further including a resilient seal member interposed between said seat ring and said case when said seat ring is mounted on said case.

6. The improvement of claim 1 wherein said seat ring further includes at least one tool surface exposed and accessible through said case upon removal of said sprinkler member and said inlet control valve from said case.

7. The improvement of claim 6 wherein said at least one tool surface comprises at least one recessed tool flat.

8. The improvement of claim 1 including snap ring means for removably mounting said sprinkler member within said case.

9. The improvement of claim 1 including snap ring means for removably mounting said inlet control valve within said case.

10. The improvement of claim 1 wherein said inlet fitting is disposed at a lower end of said case, said seat ring being accessible and removable through an upper end of said case.

11. The improvement of claim 1 wherein said seat ring is threadably mounted on said case.

12. The improvement of claim 1 wherein said sprinkler member comprises a pop-up sprinkler member.

13. The improvement of claim 1 wherein said inlet control valve comprises a pressure responsive valve assembly.

14. In an irrigation sprinkler having a hollow sprinkler case with an upper end and a lower end, a sprinkler member removably mounted within said case, an inlet fitting generally at the lower end of said case and adapted for connection to a water supply line, and an inlet control valve removably mounted within said sprinkler case for controlling water inflow through said inlet fitting into said case, the improvement comprising:

a seat ring removably mounted on said sprinkler case generally at said lower end and defining a valve seat for engagement by said inlet control valve to control water inflow through said inlet fitting into said case; and an inlet filter screen connected to said seat ring and positioned generally within said inlet fitting upstream from said valve seat when said seat ring is mounted on said case;

said seat ring being accessible from the upper end of said case upon removal of said sprinkler member and said inlet control valve for removal of said seat ring and said filter screen together and to permit selective replacement thereof without requiring disassembly of said sprinkler case from the water supply line.

15. The improvement of claim 14 wherein said filter screen is formed integrally with said seat ring.

16. The improvement of claim 14 wherein said seat ring further includes at least one tool flat exposed and accessible from the upper end of said case upon removal of said sprinkler member and said inlet control valve from said case.

17. The improvement of claim 14 including snap ring means for removably mounting said sprinkler member within said case.

18. The improvement of claim 14 including snap ring means for removably mounting said inlet control valve within said case.

19. The improvement of claim 14 wherein said seat ring is threadably connected to said case.

* * * * *